May 13, 1952 M. SEYMOUR 2,596,179
SUPPORTED ADHESIVE SHEET MATERIAL UNIT AND
METHOD OF MAKING THE SAME
Filed Jan. 4, 1951 2 SHEETS—SHEET 1
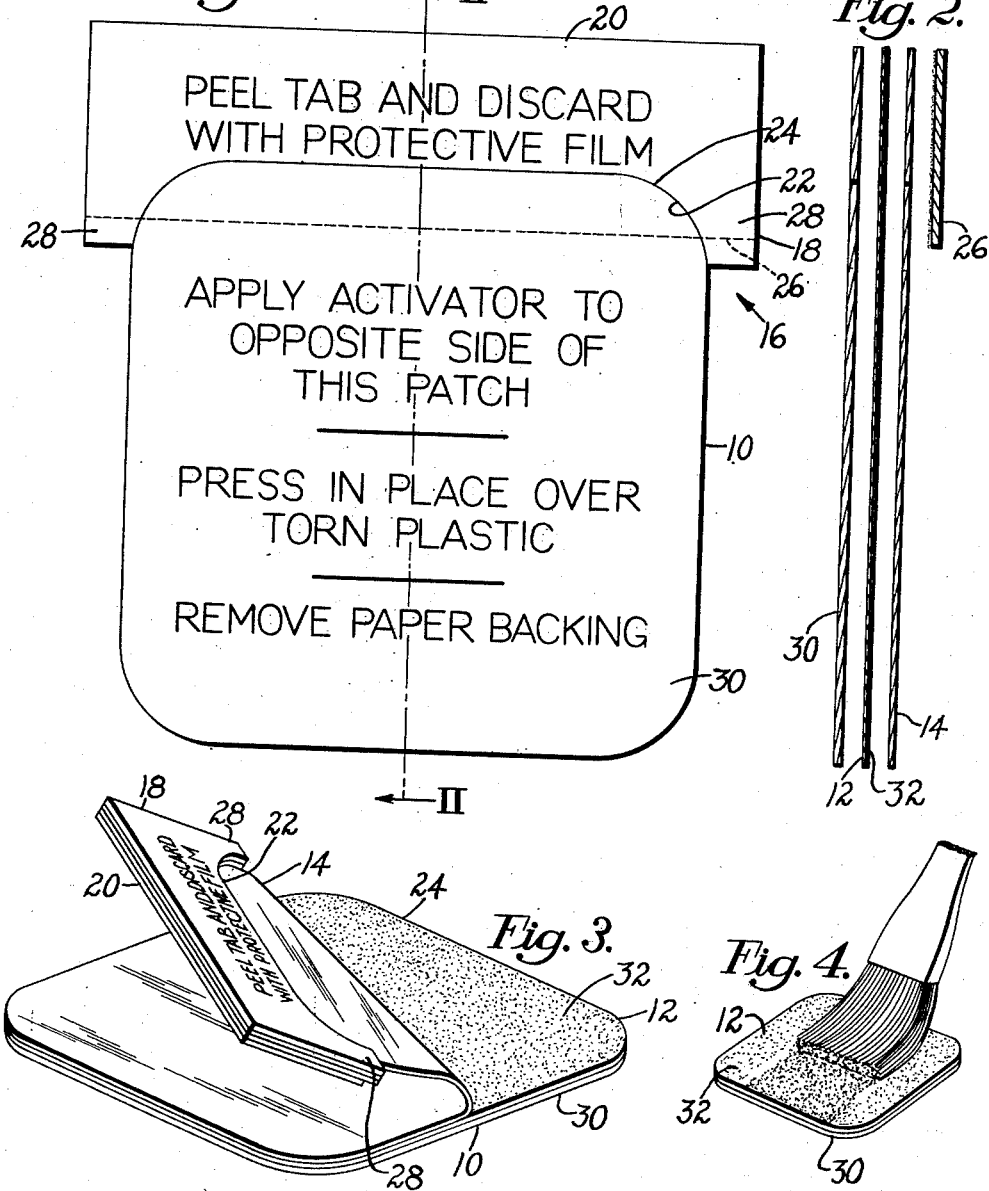
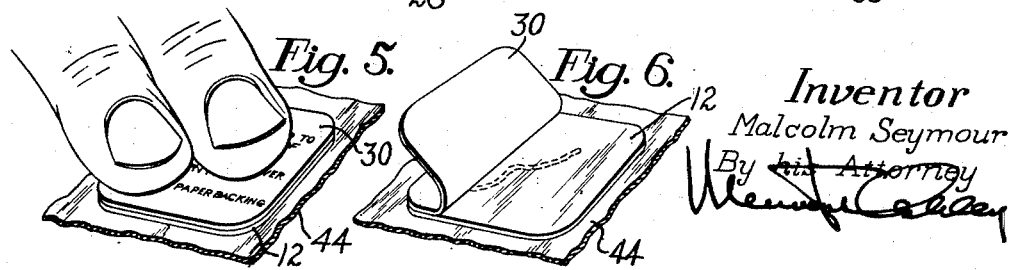
Inventor
Malcolm Seymour
By his Attorney

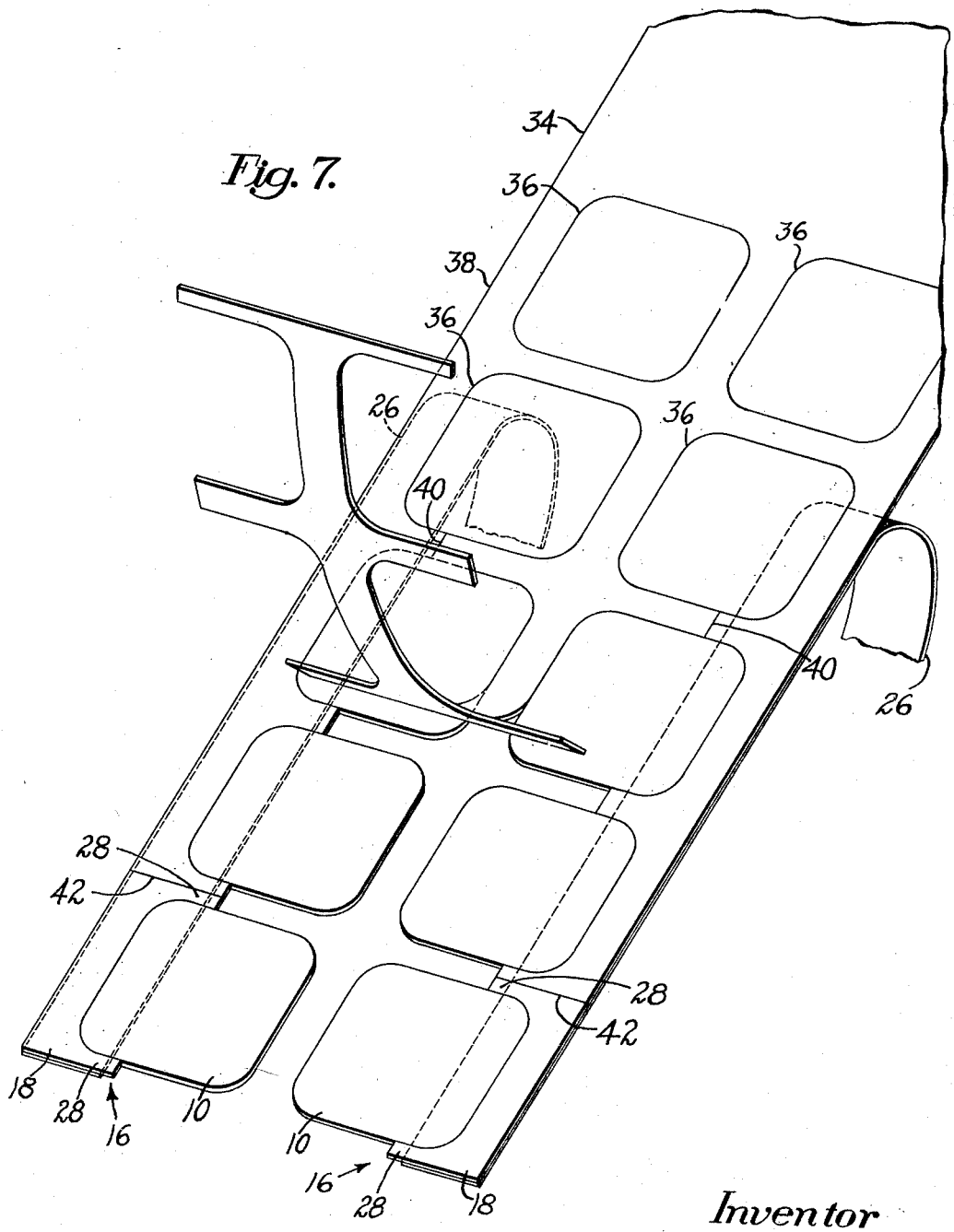

Patented May 13, 1952

2,596,179

UNITED STATES PATENT OFFICE 2,596,179

SUPPORTED ADHESIVE SHEET MATERIAL UNIT AND METHOD OF MAKING THE SAME

Malcolm Seymour, Boston, Mass., assignor to B. B. Chemical Co., Boston, Mass., a corporation of Massachusetts Application January 4, 1951, Serial No. 204,389

9 Claims. (Cl. 154—79)

This invention relates to a repair patch assembly for reinforcing, repairing or bonding plastic sheet material.

Thin plastic sheet material, particularly polymerized vinyl resin flexible film, is being used increasingly in many fields because of its desirable appearance, strength and resistance to wear. In many of these uses, for example in inflatable objects such as cushions, play balls and upholstering, the sheet material is subjected either constantly or intermittently to considerable tension. Breaks or tears occurring in plastic sheet material subjected to tension rapidly develop in size because of the extremely low tear resistance of the material; and repair of such breaks or tears must be effected promptly to avoid irreparable damage. In general, when objects such as those above enumerated are perforated or cracked, it has not been possible to effect a satisfactory repair with equipment available in the home.

In my previous application Serial No. 144,147 of February 14, 1950, there is disclosed a composite laminated sheet adapted for effective manipulation to secure a thin plastic sheet adhesively to a surface.

The composite sheet of that application is a flexible, thin, plastic sheet material non-adhesively combined with a flexible, non-stretchable, smooth-surfaced, disposable carrier sheet, and coated on the face opposite the carrier sheet with a non-pressure sensitive, activatable adhesive. The composite of carrier sheet and plastic sheet has a stiffness which holds the plastic sheet in smooth, unwrinkled condition when the adhesive is activated and prevents the sheet from accidental bending which might bring adhesive coated portions together and cause adhesion between those portions of the surface. On the adhesive coated face of the composite there is provided a protective cover sheet, preferably of very thin flexible polyethylene, to protect the adhesive from dirt, grease or other contamination which might interfere with ultimate formation of a strong bond between the plastic repair sheet and the surface being repaired. The sheet polyethylene clings to the surface of the adhesive coating although there is no evidence of an adhesive bond being formed between the adhesive and the protective cover sheet.

It has been found that the removal of the protective cover sheet is troublesome because of the thinness and flexibility of the sheet particularly where its edges exactly coincide with the edges of the composite sheet as occurs where the cover sheet is in place when patches are died out.

Aside from the difficulties attendant on manufacturing patches wherein portions of the cover sheet might extend beyond the boundaries of the patch proper, the extreme flexibility of the cover sheet resulted in its peeling back from the margins of the patch proper to some extent adjacent such overlapping portions of the cover sheet so that the adhesive face at the edge of the patch was subject to contamination. This is a serious defect since it is the edges of a patch which are subject to the most destructive combination of forces tending to separate the patch from the repaired surface.

It is a feature of the present invention to provide a patch assembly construction which insures effective protection by the cover sheet of the adhesive surface prior to use and which provides for rapid convenient removal of the cover sheet from the adhesive surface at the time of use.

The repair patch assembly of the present invention is a combination of a patch member of sheet material having an adhesive coated face with a protective sheet clinging to the face of the adhesive and having an edge portion complementary to and disposed in a recess in a tab member, with the protective cover sheet secured to the tab. In a preferred embodiment of the patch assembly, the protective cover sheet is joined to the tab and the patch and tab are held in alinement by a combining piece which extends across the recess in the tab and is secured flat to the face of the tab and the exposed face of the protective cover sheet on the patch member so that the tab and combining piece cooperate to guard the edge of the protective cover sheet against accidental displacement from the adhesive coated face of the patch and to aid in peeling the cover sheet from the patch prior to use.

The invention will be further described in connection with the accompanying drawings forming part of the disclosure of the present invention. In the drawings, Fig. 1 is a plan view of a repair patch assembly of supported plastic according to the present invention;

Fig. 2 is an exploded sectional view taken on the line II—II of Fig. 1;

Fig. 3 is an angular view of a repair patch assembly of supported plastic adhesive laminated sheet according to the present invention with the protective cover partially peeled back;

Fig. 4 is an angular view showing activating the adhesive of the laminated sheet;

Fig. 5 is an angular view showing the assembly of the repair patch of supported plastic adhesive sheet and the surface of a plastic sheet to be repaired;

Fig. 6 is an angular view showing the carrier sheet being stripped from the assembly; and Fig. 7 is a diagrammatic angular view showing the manufacture of repair patch assemblies.

A patch member 10 composed of an adhesive coated sheet 12 with a protective cover sheet 14 on the adhesive and constituting a part of the patch assembly 16 of the present invention is shown in Figs. 1 to 4 as having a generally rectangular outline with rounded corners, although other shapes may be used. With this patch member 10 there is associated a tab member 18 also of sheet material which may be, but is not necessarily, of the same material as the patch member. The tab member 18 comprises a body portion 20 suitable for grasping between the fingers, and a recess 22 complementary in outline to an edge portion 24 of the patch member 10. The patch member 10 is positioned with its complementary edge portion 24 adjacent the edges of the recess 22 in the tab and the tab 18 and patch member 10 are held together in alinement by a combining piece or strip 26. As shown in Fig. 1, the combining piece or strip 26 may be formed of sheet material extending across the recess 22 in the tab 18 and bonded to the faces of the tab arms 28 defining the recess 22. The protective cover sheet 14 of the patch member 10 is bonded to the combining strip 26 in that portion of the combining piece which extends over the recess. The tab arms 28 partially surround the patch member 10 and the combining strip 26 prevents up or down displacement of the edge portions 22 of the patch relative to the edge portions of the recess 22 in the tab and holds the tab 20 and patch 10 in alinement. Removal of the protective cover 14 requires a direct upward pull of the portion of the cover within the recess 22 away from the adhesive coated sheet 12 or a bending of the tab 20, combining piece 26 and protective cover 14. Also, since the tab 20 and patch member 10 lie in the same plane, the joint between the adhesive coated sheet 12 and the protective cover 14 is kept free from foreign matter which might facilitate displacement of the protective cover.

The combination of recessed tab 20 and patch member 10 with a combining piece 26 to hold them in alinement is useful for the protection of adhesive coated sheet material patches in general. However, the combination is of particular utility where the tab and patch are cut from a composite laminated sheet adhesive material of the type described, disclosed and claimed in my prior application above identified. That is, the relative stiffness of such laminated material insures satisfactory alinement retaining ability between the patch member 10 and the tab member 20.

In the composite laminated sheet forming the subject-matter of my prior application, a thin plastic sheet 12 is associated in intimate, clinging, but non-adhesive engagement with a relatively stiff but flexible carrier sheet 30, and a dry layer 32 of substantially non-tacky, non-pressure sensitive, activatable adhesive is bonded to the exposed face of the plastic sheet 12. This special engagement between the carrier sheet 30 and the thin plastic sheet 12 may be obtained by forming the plastic sheet 12 directly on the carrier sheet 30 as by calendering or by coating one face of the carrier sheet with a fluid dispersion of the plastic such as a plastisol or organisol, or with a volatile, usually organic, solvent solution of the plastic. Plastisol or organisol coatings are subsequently heated to fuse together the plastic particles to provide a continuous sheet 12; and solution coatings are dried to remove the solvent. These methods of forming the sheet 12 bring the plastic and the carrier sheet 30 into extremely intimate relation in which the plastic sheet 12 is protected from curling and wrinkling when the adhesive is activated. The plastic material must not be keyed to the carrier sheet 30, however, and particularly where the plastic is applied in fluid condition, the surface of the carrier sheet 30 must be smooth and impervious to the fluid so that the plastic material does not penetrate the surface of the carrier sheet 30.

Suitable carrier sheets 30 include substantially non-stretchable, somewhat flexible sheet materials which are not soluble in the plastic, the plasticizer, or the solvent present in the plastic applied to their surface and which have a smooth imperforate surface. For reasons of cheapness and convenience in handling, a super-calendered, heavy paper sheet is preferred, but paper heavily sized with casein, glue or other coating which is not affected by the plastic, solvent, or plasticizer may be used. Other suitable supporting surfaces include cellophane and glassine paper.

Preferred plastic materials for application to the surface of the carrier sheet to form the plastic sheet are commercially available, waterproof, polymerized vinyl resins including the vinyl chloride polymer resins, the vinyl chloride-vinyl acetate copolymer resins containing from 85% to 95% by weight of vinyl chloride, the vinyl chloride-vinylidene chloride copolymer resins and other waterproof polyvinyl resins. It is preferred that the plastic sheet 12 on the carrier 30 be of substantially the same thickness as the sheet or sheets of plastic to which it is to be applied for repair, reinforcement or bonding purposes. Plastic sheets from 0.002 to 0.02 inch in thickness have been found very satisfactory.

On the exposed surface of the plastic sheet a layer 32 of activatable adhesive in dry substantially non-tacky and non-pressure sensitive condition is provided. In a preferred embodiment this adhesive is activatable both by a simple treatment with a volatile organic solvent and by the application of heat. It is not necessary that the adhesive be both heat and solvent activatable, however, since in many cases the benefits of this invention are obtainable where the bond is activatable solely by solvent or solely by heat.

A preferred adhesive comprises a butadiene-acrylonitrile copolymer synthetic rubber having an acrylonitrile content of from 25% to 45% and a linear polymeric toughening agent which may be a vinyl chloride-vinyl acetate copolymer containing from 85% to 93% vinyl chloride, a chlorinated rubber having a chlorine content of approximately 67%, or mixtures of these. From 25 to 60 parts by weight of the linear polymeric toughener are employed with 100 parts by weight of the butadiene-acrylonitrile copolymer. The adhesive may be applied to the surface of the plastic sheet 12 by any suitable method such as knife spreading, brushing, calendering, or other known procedure. Using a knife spreader, an 18% to 35% solids content volatile organic solvent solution of butadiene-acrylonitrile copolymer and toughener is applied to the plastic sheet 12. Suitably, the coating may be from 0.012 to 0.015 inch in wet thickness. The coating is dried carefully to prevent formation of bubbles during the drying step in order to provide a continuous adhesive layer or coating 32. The thickness of the adhesive coating 32 is not critical but it is important that a continuous coating be formed and ordinarily an adhesive coating of from .002 to .003 inch in dry state is provided.

Cover sheet 14 is disposed on the adhesive layer 32 to protect it from dirt, grease, etc., which might interfere with ultimate formation of a bond. Sheet polyethylene is a preferred cover sheet material since it will cling to the surface of the adhesive although there is no evidence of an adhesive bond being formed between the adhesive and the polyethylene sheet. It would appear that the primary force holding the polyethylene sheet 14 in place is atmospheric pressure, substantially all air having been squeezed out from between the polyethylene sheet 14 and the layer of adhesive 32.

The laminated sheet including the protective cover sheet is cut to form the patch assembly 16 of the present invention. This is done preferably in a progressive manner from a continuous strip 34 of the laminated material. As shown diagrammatically in Fig. 7, die cuts 36 form rows of patch members 10 which are spaced from each other and from the edges of the strip 34, the remaining portions of the strip 34 constituting a skeleton framework 38, the cut edges of which are at least in part in contact with the cut edges of the patch members 10 and tend to hold the patch members 10 in place. Uncut shreds of material (not shown) between patch members 10 and skeleton framework 38 may also aid in holding the patch members 10 in place. After the die cuts 36 are made, a combining piece 26 is applied to the exposed surface of the protective sheet, being positioned and secured lengthwise along a continuous lengthwise portion of the skeleton 38. The combining piece 26 extends widthwise part way along the transverse portions of the skeleton 38 and is secured to these portions and to end portions of the row of patch members 10 within the recess 22 formed by the lengthwise portion and transverse portions of the skeleton 38 constituting arms 28 at the sides of the recess. In the preferred embodiment where the protective cover 14 is a polyethylene sheet, the preferred combining piece 26 is a strip of paper or similar material having a layer of a rubber base pressure-sensitive adhesive on the face which will contact the protective cover sheet 14. After the combining piece 26 is applied, the transverse members are cut, as shown at 40, adjacent the edge of the combining piece 26; and the portion of the skeleton 38 not secured to the combining piece is removed. Thereafter the joined patch members 10 and skeleton portion 38 are separated into individual patch assemblies 16 by cutting the skeleton and combining piece connecting adjacent patch members as shown at 42. In each patch assembly the skeleton portion 38 and combining piece 26 constitute a tab 20 having a recess 22 in which an end portion of a patch member 10 is disposed.

In the resulting patch assembly 16, the stiffness of the tab 20 including the tab arms 28 resists bending of the combining piece 26 or strip at the joint between the edge of the patch member 10 and edge of the tab 20. Separation of the protective cover 14 from the adhesive coated face of the sheet 12 requires a direct separatory motion of a substantial portion of the protective cover 14 away from the sheet 12. The atmospheric pressure force holding the cover member 14 in place is very substantially more effective in resisting such a separatory motion than in resisting a simple peeling action where the separatory force is concentrated along a line and air has access to the joint between the protective cover 14 and the adhesive coated face of the sheet 12. It has been found that the force holding the protective cover 14 in place in the patch assembly 10 of the present invention is adequate to prevent accidental separation of the cover sheet 14. Additionally, since the tab 20 is held against movement out of alinement with the patch member 10, the joint between the edges of the tab 20 and of the patch member 10 does not open up and access of dirt or other contaminants to the joint between the cover sheet 14 and the adhesive coated sheet 12 is largely avoided.

In the use of the patch assembly for repair of a torn plastic sheet material 44 (see Figs. 3 to 6), the plastic sheet material 44 is spread out in wrinkle free condition. The tab 20 is bent up and moved to pull the protective cover sheet 14 away from the surface of the adhesive layer 32. The adhesive 32 is then brushed (as shown in Fig. 4), sprayed or otherwise treated with a volatile organic solvent to activate the adhesive 32, and the activated adhesive layer 32 is pressed firmly against the surface of the plastic sheet material in position to cover the torn areas of the torn plastic sheet material as shown in Fig. 5. Satisfactory bonds are obtainable by simply pressing the assembled sheet materials by hand or with a hand roller to insure uniform contact between the adhesive layer 32 and plastic sheet material 44 to be bonded or repaired. The carrier sheet 30 may then be stripped from the plastic sheet 12 of the patch member 10.

The following examples are given as of possible assistance in understanding the invention and it is to be understood that the examples are to be regarded as illustrative only and that the invention is not limited to the details or specific procedures employed in the examples except as defined in the appended claims:

*Example I.*—A sheet of plasticized vinyl copolymer resin containing approximately 95% of vinyl chloride (Vinylite VYNW) was formed on a super-calendered paper supporting sheet by depositing on the sheet a plastisol comprising 100 parts of the vinyl copolymer resin, and 45 parts of the plasticizer dioctyl phthalate, and heating the paper with the plastisol thereon to fuse together the particles of resin to form a continuous resin sheet in intimate clinging engagement to the paper supporting sheet, but not keyed or otherwise adhesively bonded.

An adhesive solution was prepared by forming an intimate mixture of 100 parts of a butadiene-acrylonitrile copolymer having 33% acrylonitrile content (Hycar OR 25NS) and 40 parts of a vinyl chloride-vinyl acetate copolymer having an 85% to 88% vinyl chloride content (Vinylite VYHH) and dissolving this mixture in a mixed solvent comprising 70 parts by volume of toluene and 30 parts by volume of methyl isobutyl ketone. This solution is brought to a 26% solids content by addition of further solvent mixture.

The sheet of plastic adhering to the paper supporting sheet was passed through a knife spreader and a coating of 0.015 inch wet thickness of the adhesive was spread on the free surface of the vinyl resin sheet. The coating was dried by passing it through an oven and circulating air around it at a temperature of 160° to 170° F. for six minutes. A coating of approximately 0.003 inch in thickness was obtained. A sheet of polythene was applied to the surface of the dried adhesive and pressed down smoothly thereon.

A generally square wafer having rounded corners and a tab having a recess complementary to an edge of the patch and having arms extending around the rounded corners of one edge of the patch and projecting down approximately ¼ of the length of adjacent sides of the patch were cut out of a sheet of the composite material. A strip of pressure-sensitive adhesive tape of which the adhesive was a conventional rubber base adhesive was applied to extend across the recess in the tab, with its end portions bonded to the arms of the tab and its intermediate portions bonded to the body of the tab and to the portion of the patch within the recess in the tab.

In using this material, the tab was operated to strip the cover sheet from the adhesive coated face of the patch, and the exposed adhesive was brushed with a solvent comprising 20% by volume of cyclohexanone and 80% by volume of methyl ethyl ketone. After 20 seconds the patch was positioned with the activated adhesive surface over a tear in a sheet of 12 gage flexible plasticized vinyl chloride-vinyl acetate copolymer resin sheet containing about 95% vinyl chloride and pressed into intimate contact with the resin sheet. The paper supporting sheet was then stripped off, the resin patch being firmly adhered to the plasticized vinyl copolymer resin sheet by the adhesive. A strong bond was formed immediately such that the resin patch could not be stripped from the plasticized copolymer resin sheet without damaging the repaired sheet and the resin patch sheet.

*Example II.*—An adhesive solution was prepared comprising 100 parts of a butadiene-acrylonitrile copolymer having an acrylonitrile content of 26% (Paracril 26), 25 parts of a mineral filler (Dixie Clay), 10 parts of a finely powdered silica gel (Santocel CX), 50 parts of chlorinated rubber having a chlorine content of 67% and a viscosity of 125 centipoises (Parlon 25), and 10 parts of a vinyl chloride-vinyl acetate copolymer having a vinyl chloride content of 88.5% to 90.5% (Vinylite VYNS) in a solvent comprising 75 parts by volume of a mineral oil solvent (Solvesso 100) and 25 parts by volume of cyclohexanone. The solution was brought to a solids content of 25%.

This solution was coated on a vinyl resin sheet carried by a super-calendered paper sheet, dried, covered with a protective polythene sheet, and died out to form a patch and tab as in Example I. A strip of pressure-sensitive adhesive tape was applied to extend across the recess in the tab with its end portions bonded to the arms of the tab and its intermediate portions bonded to the body of the tab and to the portion of the patch within the recess of the tab. In using this material, the tab was lifted to strip the cover sheet from the adhesive coated face of the patch, and the exposed adhesive was brushed with a solvent comprising 20% by volume of cyclohexanone and 80% by volume of methyl ethyl ketone. After 20 seconds the activated adhesive surface of the patch was pressed against a plasticized flexible vinyl chloride-vinyl acetate copolymer resin containing about 85% vinyl chloride and was pressed into intimate contact with the resin sheet. The paper supporting sheet was moistened to facilitate its removal and was then stripped off, the resin patch being firmly adhered to the plasticized vinyl copolymer resin sheet by the adhesive.

Having described my invention, what I claim as new and desire to secure by Letters Patent of the United States is:

1. A patch assembly comprising a tab of sheet material having a recess in an edge of the tab, a patch of sheet material having an adhesive coated face and having an edge portion complementary to and adjacent the edges of said recess, a flexible protective cover sheet in clinging engagement with the adhesive coated face of the patch but readily removable therefrom and a combining piece secured to said tab and said cover sheet to maintain said tab in alinement with said patch and to peel said cover sheet from said patch when the tab is moved away from said patch.

2. A patch assembly comprising a patch and tab of sheet material having an adhesive coated face, said tab having a recess in an edge and said patch having an edge portion complementary to and adjacent the edges of said recess, a flexible protective cover sheet in clinging engagement with the adhesive coated faces of the tab and patch but readily removable therefrom and a combining piece extending across said recess and adhesively secured to the cover sheet on said tab and patch, said strip serving to maintain said tab in alinement with said patch and to peel said cover sheet from said patch when the tab is moved away from said patch.

3. A patch assembly comprising a patch and tab of sheet material having an adhesive coated face, said tab having a recess in an edge of the tab, and said patch having an edge portion complementary to and adjacent the edges of said recess, a flexible protective cover sheet in clinging engagement with the adhesive coated faces of the tab and patch but readily removable therefrom and a combining strip having one face coated with a pressure sensitive adhesive, said strip extending across said recess and secured by said pressure sensitive adhesive to the cover sheet on said tab and patch, said strip serving to maintain said tab in alinement with said patch and to peel said cover sheet from said patch when the tab is moved away from said patch.

4. A patch assembly comprising a patch, a tab and a combining strip, said tab having a recess in an edge and said patch having an edge portion complementary to and adjacent the edges of said recess, said patch and tab being formed of laminated sheet material comprising a non-stretchable, smooth surfaced supporting sheet, a thin, flexible, stretchable, plastic sheet having a smooth surface in intimate clinging engagement with said supporting sheet but not adhesively bonded to said supporting sheet, a dry film of activatable, substantially non-tacky adhesive bonded to the surface of said plastic sheet which is not in contact with the supporting sheet, and a protective sheet in clinging engagement with said film of adhesive but readily removable for activation of said adhesive, said combining strip extending across the recess in said tab and being adhesively secured to the exposed faces of the protective sheet layer of said patch and tab to maintain said tab in alinement with said patch and to peel said protective sheet from protective relation to the adhesive film of the patch when the tab is moved away from the patch.

5. A patch assembly comprising a patch, a tab and a combining strip, said tab having a recess in an edge and said patch having an edge portion complementary to and adjacent the edges of said recess, said patch and tab being formed of laminated sheet material comprising a flexible, non-stretchable, smooth surfaced, paper supporting sheet, a thin sheet of flexible, stretchable, waterproof vinyl resin having a smooth surface in intimate clinging engagement with said supporting sheet but not adhesively bonded to said supporting sheet, a dry film of activatable, substantially non-tacky adhesive bonded to the surface of said resin sheet which is not in contact with the supporting sheet, and a layer of polyethylene sheet material in clinging engagement with said film of adhesive but readily removable for activation of said adhesive, said combining strip extending across the recess in said tab and being adhesively secured to the exposed faces of the polyethylene layer of said patch and tab to maintain said tab in alinement with said patch and to peel said polyethylene layer from protective relation to the adhesive film of the patch when the tab is moved away from the patch.

6. A patch assembly comprising a patch, a tab and a combining piece, said tab having a recess in an edge and said patch having an edge portion complementary to and adjacent the edges of said recess, said patch and tab being formed of laminated sheet material comprising a flexible, non-stretchable, smooth surfaced, paper supporting sheet, a thin sheet of flexible, stretchable, waterproof vinyl resin having a smooth surface in the intimate clinging engagement obtained by forming said resin sheet from a fluid mass of resin directly on said supporting sheet, said resin sheet not being adhesively bonded to the smooth surface of said supporting sheet, a dry film of activatable, substantially non-tacky adhesive bonded to the surface of said resin sheet which is not in contact with the supporting sheet, and a layer of polyethylene sheet material in clinging engagement with said film of adhesive but readily removable for activation of said adhesive, said combining strip extending across the recess in said tab and being secured by a layer of pressure sensitive adhesive on one face of the strip to the exposed faces of the polyethylene layer of said patch and tab to maintain said tab in alinement with said patch and to peel said polyethylene layer from protective relation to the adhesive film of the patch when the tab is moved away from the patch.

7. A continuous method for making repair patch assemblies having a tab and a patch and formed of a laminated sheet material composed of an adhesive coated sheet and a flexible protective sheet in clinging non-adhesive engagement with the adhesive on the adhesive coated sheet, said method comprising the steps of forming in a strip of the laminated sheet material cuts defining a row of patch shapes spaced from the edges of the strip and from each other wherein each patch shape is surrounded by and maintained in place in the skeleton formed by the remainder of the strip. securing a combining piece to the exposed surface of the protective sheet of said strip with portions joined to the skeleton surrounding end portions of successive patch shapes and other portions joined to said end portions, cutting the skeleton portions of the strip adjacent the edge of said combining piece, removing the skeleton portions not secured by said combining piece from engagement with the patch shapes and cutting the combining piece and skeleton portions connecting adjacent patch shapes to form individual patch assemblies.

8. A continuous method for making repair patch assemblies having a tab and a patch and formed of a laminated sheet material composed of an adhesive coated sheet and a flexible protective sheet in clinging non-adhesive engagement with the adhesive on the adhesive coated sheet, said method comprising the steps of forming in a strip of the laminated material cuts defining a row of patch shapes spaced from the edges of the strip and from each other wherein each patch shape is surrounded by and maintained in place in the skeleton formed by the remainder of the strip, securing a combining piece of sheet material with one face adhesively bonded to the exposed surface of the protective sheet of said strip, portions of the combining piece adhering to the skeleton surrounding the end portions of successive patch shapes and other portions extending across the openings in the skeleton and adhered to the patch shapes to hold the ends of said patch shapes firmly in alinement with adjacent portions of the skeleton, cutting the skeleton portions of the strip adjacent the edge of said combining piece, removing the skeleton portions not secured by said combining piece from engagement with the patch shapes and cutting the combining piece and skeleton portions connecting adjacent patch shapes to form individual patch assemblies.

9. A continuous method for making repair patch assemblies having a tab and a patch and formed of a laminated sheet material composed of an adhesive coated flexible, stretchable, waterproof vinyl resin sheet having a smooth surface non-adhesively secured to a non-stretchable smooth surfaced paper supporting sheet in the intimate clinging engagement obtained by forming said resin sheet from a fluid mass of resin directly on said supporting sheet, and a flexible protective sheet of polyethylene in clinging engagement with the adhesive on said resin sheet, said method comprising the steps of forming in a strip of the laminated material cuts defining a row of patch shapes spaced from the edges of the strip and from each other wherein each patch shape is completely surrounded by and maintained in place in the skeleton formed by the remainder of the strip securing a combining piece of sheet material with one face adhesively bonded to the exposed surface of the protective sheet of said strip, portions of the combining piece adhering to the skeleton surrounding the end portions of successive patch shapes and other portions extending across the openings in the skeleton and adhered to the patch shapes to hold the ends of said patch shapes firmly in alinement with adjacent portions of the skeleton, cutting the skeleton portions of the strip adjacent the edge of said combining piece, removing the skeleton portions not secured by said combining piece from engagement with the patch shapes and cutting the combining piece and skeleton portion connecting adjacent patch shapes to form individual patch assemblies.

MALCOLM SEYMOUR.

REFERENCES CITED

The following references are of record in the file of this patent:

UNITED STATES PATENTS

| Number | Name | Date |
|---|---|---|
| 2,248,318 | Van Cleef | July 8, 1941 |
| 2,372,994 | Welch | Apr. 3, 1945 |

FOREIGN PATENTS

| Number | Country | Date |
|---|---|---|
| 26,706 | Great Britain | of 1910 |